(12) United States Patent
Wei et al.

(10) Patent No.: US 10,205,523 B2
(45) Date of Patent: Feb. 12, 2019

(54) DESIGNING AND CONFIGURING PACKET OPTICAL NETWORKS

(71) Applicant: Futurewei Technologies, Inc., Plano, TX (US)

(72) Inventors: Wei Wei, Plano, TX (US); Junqi Ma, Shenzhen, TX (US); Feng Liu, Shenzhen (CN)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 155 days.

(21) Appl. No.: 14/827,136

(22) Filed: Aug. 14, 2015

(65) Prior Publication Data

US 2017/0047999 A1  Feb. 16, 2017

(51) Int. Cl.
*H04L 12/24* (2006.01)
*H04B 10/27* (2013.01)

(52) U.S. Cl.
CPC ............ *H04B 10/27* (2013.01); *H04L 41/12* (2013.01); *H04L 41/14* (2013.01)

(58) Field of Classification Search
CPC ............... H04J 14/0227; H04J 14/0264; H04J 14/0267; H04L 41/12; H04L 41/14
See application file for complete search history.

(56) References Cited

U.S. PATENT DOCUMENTS 8,369,222 B2  2/2013  Kakadia et al.
2002/0156914 A1*  10/2002  Lo .................. H04L 41/0213
                                                              709/238
2013/0011132 A1  1/2013  Blair
2013/0156416 A1*  6/2013  Kim .................... H04B 10/032
                                                              398/2

(Continued)

OTHER PUBLICATIONS

Dijkstra, "A Note on Two Problems in Connexion with Graphs," Numerische Mathematik 1, pp. 269-271, 1959.

(Continued)

*Primary Examiner* — Mansour Oveissi
*Assistant Examiner* — David M Oveissi
(74) *Attorney, Agent, or Firm* — Conley Rose, P.C.

(57) ABSTRACT

A packet optical network configuring method including obtaining network information that includes an optical reachability graph for a packet optical network, generating a packet reachability graph using the network information, generating a packet transport design for a network configuration for the packet optical network based on the packet reachability graph, generating an optical transport design for the network configuration, determining the network configuration is acceptable when the network configuration meets one or more predefined user objectives, and outputting the network configuration based on the determination. An apparatus including a receiver configured to obtain network information that includes an optical reachability graph for a packet optical network, a memory, and a processor coupled to the receiver and the memory, and configured to generate a set of packet reachability graphs using the network information, where each packet reachability graph from the set of packet reachability graphs interconnects a plurality of integrated packet optical network nodes for packet switching and optical switching.

20 Claims, 14 Drawing Sheets

(56) References Cited

U.S. PATENT DOCUMENTS

| | | | | |
|---|---|---|---|---|
| 2013/0294228 A1* | 11/2013 | Ahuja | ............... | H04L 41/0654 370/228 |
| 2014/0099119 A1 | 4/2014 | Wei et al. | | |
| 2014/0317251 A1* | 10/2014 | Hallivuori | ........... | H04L 41/0823 709/221 |
| 2015/0304158 A1* | 10/2015 | Dharmadhikari | ..... | H04L 41/046 714/37 |

OTHER PUBLICATIONS

"Understanding MPLS-TP and Its Benefits," Cisco, White Paper, http://www.cisclo.com/en/US/technologies/tk-436/tk428/white_paper_c11-562013.html, 2009, 2 pages.

"VLAN an QinQ Technology," White Paper, Huawei Technologies, Issue 1.01, Oct. 30, 2012, 25 pages.

"Converged Packet Transport—Evolution of Core Networks: from Circuit to Packet," White Paper, Juniper Networks, 2013, http://www.juniper.net/us/en/local/pdf/whitepapers/2000402-en.pdf, 26 pages.

"Leveraging the Benefits of Provider Backbone Bridges," White Paper, http://www.brocadechina.com/download/Leveraging_Benefits_PBB_WP01.pdf, 2010, 8 pages.

Siracusa, et al., "Multi-layer Design of an MPLS-TP Based Carrier Ethernet Network," ONDM 2011, pp. 1-6.

Engel, et al., "Packet Layer Topologies of Cost Optimized Transport Networks," ONDM 200, Feb. 2009, 7 pages.

Skiena, "The Algorithm Design Manual," Second Edition, Department of Computer Science, State University of New York at Stony Brook, New York, 2008, 739 pages.

Fang, et al., "The Evolution of Carrier Ethernet Services—Requirements and Deployment Case Studies," Next-Generation Carrier Ethernet Transport Technologies, IEEE Communications Magazine, Mar. 2008, pp. 69-76.

"Virtual Bridged Local Area Networks, Amendment 10: Provider Backbone Bridge Traffic Engineering," IEEE Computer Society, IEEE Std. 802.1Qay, Aug. 5, 2009, 145 pages.

* cited by examiner

DESIGNING AND CONFIGURING PACKET OPTICAL NETWORKS

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Flexible bandwidth demands of data center applications, mobile backhaul, and broadband Internet access are driving telecom service providers to investigate more direct use of connection-oriented packet transport technologies in their traditional circuit-based optical transport networks. Carrier-grade packet transport technologies including Multi-Protocol Label Switching-Transport Profile (MPLS-TP), provider bridge (PB), provider-based bridge (PBB), and provider-based bridge traffic engineering (PBB-TE) are becoming mature and have been deployed in metro area networks (MANs). Today, most traffic flows are in Ethernet format and typically transported at a single layer, a packet layer, for example, in an Ethernet virtual circuit (EVC) or MPLS label-switched-path (LSP), or a circuit layer, for example, in an optical transport network (OTN), synchronous digital hierarchy (SDH), or directly over lambda through digital wrapper technologies, which results in higher cost and lower efficiency. With the integration of packet and optical transport, a network can adaptively transport services over the most efficient layer for different types of traffic flows, not just the pre-defined transport technology. For example, a switched Ethernet service could traverse the network partially over OTN and then over MPLS-TP before being handed off as Ethernet, if that were most efficient.

Packet transport and optical transport have been brought into one network element (NE) for carrying various types of traffic flows. Architecturally, each NE can contain multiple units including Ethernet/MPLS-TP for data packets, OTN/SDH for time-division multiplexing (TDM), and lambda fabrics. For the interface cards, hybrid OTN/Ethernet/MPLS-TP line interfaces have been developed. Moreover, the logically centralized network controller such as path-computation-entity (PCE) and software-defined-network (SDN) have been proposed recently to evaluate all layers of the network intelligently to determine which layer is the best to transport traffic flows. This enables the seamless integration of packet and optical transport network for the application flows. The packet optical combination can create the most efficient transport solution for a given mixed TDM/packet traffic flows matrix, but it depends on how packet optical transport resources will be effectively dimensioned in advance. To maximize the gains of optical bypass introduced by optical transport and statistical multiplexing introduced by packet transport, an advanced network planning and design system is necessary, designed with enough foresight into bandwidth growth to be able to meet future needs with existing infrastructure. The network planning and design system is particularly useful in metro area networks and the core of the network, whereby particular network optimization techniques can be used to minimize the total number of network element ports need to be added to satisfy the explosion of bandwidth usage.

SUMMARY

In one embodiment, the disclosure includes a packet optical network configuring method comprising obtaining, by a server, network information that comprises an optical reachability graph for a packet optical network, generating, by a server, a packet reachability graph using the network information, generating, by a server, a packet transport design for a network configuration for the packet optical network based on the packet reachability graph, generating, by a server, an optical transport design for the network configuration, determining, by a server, the network configuration is acceptable when the network configuration meets one or more predefined user objectives, and outputting, by a server, the network configuration based on the determination.

In another embodiment, the disclosure includes a packet optical network configuring method comprising obtaining, by a server, an optical reachability graph and a packet capability site configuration for a packet optical network, generating, by a server, a packet reachability graph for the packet optical network based on the optical reachability graph and the packet capability site configuration, performing, by a server, packet-layer capacity planning for the packet optical network based on the packet reachability graph, performing, by a server, optical transport network capacity planning for the packet optical network, generating, by a server, a network configuration based on the packet-layer capacity planning and the optical transport network capacity planning, determining, by a server, the network configuration is acceptable when the network configuration meets one or more predefined user objectives, and configuring, by a server, the packet optical network based on the network configuration.

In yet another embodiment, the disclosure includes an apparatus comprising a receiver configured to obtain network information that comprises an optical reachability graph for a packet optical network, a memory, and a processor coupled to the receiver and the memory, and configured to generate a set of packet reachability graphs using the network information, wherein each packet reachability graph from the set of packet reachability graphs interconnects a plurality of integrated packet optical network nodes for packet switching and optical switching.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are various embodiments for generating network abstractions and implementing the network abstractions to design and configure a packet optical network. A network abstraction describes a packet optical network in terms of the resources that are available and separates packet layer transport dimensioning from optical transport dimensioning, which makes flexible and scalable network designs possible. An example of a network abstraction is a packet reachability graph. A packet reachability graph is a packet forwarding topology that is abstracted from an underlying physical optical transport substrate by considering optical transmission constraints, site capabilities, and engineering rules and policies. The packet reachability graph may be used to interconnect network elements with packet forwarding capabilities. The packet reachability graph concentrates on the packet layer by hiding optical transport details when possible and exposing optical transport details when needed. An underlying optical transport may be based on reconfigurable optical add-drop multiplexer, OTN, and SDH technologies. The logical separation of packet resources and physical optical resources in a unified packet optical transport network is helpful in dimensioning packet resources as well as automating an optical layer.

The combination of optical layer and packet layer resources is well represented through a flexible graph model, which is transmission-capability aware. The flexible graph model follows a bottom-up methodology between packet, OTN, and physical wavelength demultiplex and multiplex (WDM) transport technologies with a simple interface. As a result, enterprises and carriers gain packet layer forwarding topology programmability and optical layer bypassing automation, which enables them to support flexible bandwidth services that readily adapt to various application scenarios. The packet reachability graph simplifies the network dimensioning process by dynamically creating a virtual network-to-network interface (NNI) link and virtual packet switch and automatically drives optical layer resources creation. As such, the multi-layer design problem has been divided into multiple single-layer problems.

Figure 1:
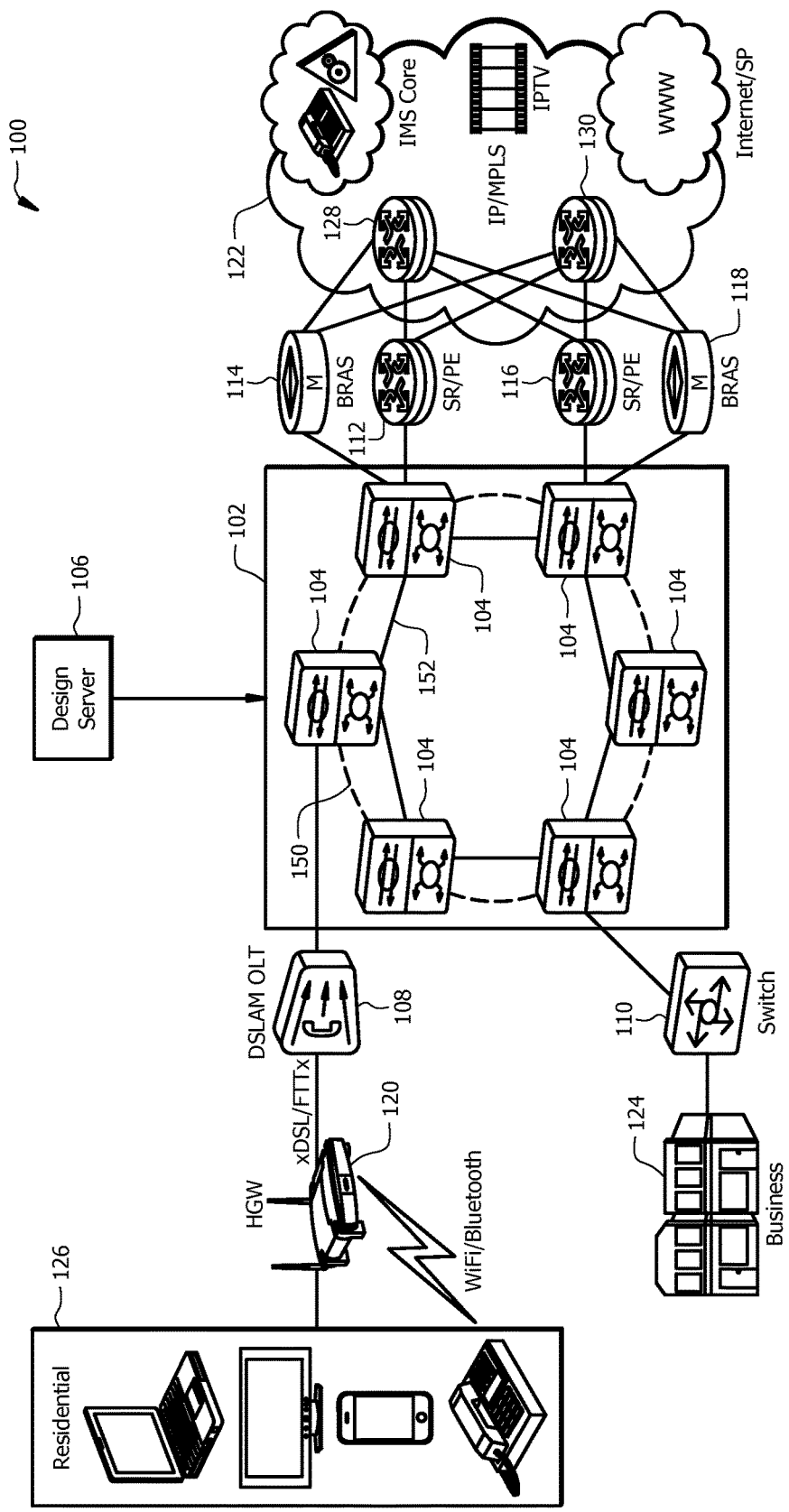
FIG. 1 is a schematic diagram of an embodiment of a system comprising a packet optical network.

FIG. 1 is a schematic diagram of an embodiment of a system 100 comprising a packet optical network. System 100 is configured to support packet transport and optical transport services among network elements using packet optical network 102. Examples of services may include, but are not limited to, Internet service, Internet Protocol Television (IPTV) services, and Internet Protocol Multimedia services. For example, system 100 is configured to transport data traffic for services between clients 124 and 126 and a service provider 122. System 100 comprises packet optical network 102, design server 106, network elements 108, 110, 112, 114, 116, 118, 120, 128, and 130, service provider 122, and clients 124 and 126. System 100 may be configured as shown or in any other suitable manner.

Examples of service provider 122 may include, but is not limited to, an Internet service provider, an IPTV service provider, and an IMS core. Clients 124 and 126 may be user devices in residential and business environments. For example, client 126 is in a residential environment and is configured to communicate data with the packet optical network 102 via network elements 120 and 108 and client 124 is in a business environment and is configured to communicate data with the packet optical network 102 via network element 110.

Packet optical network 102 comprises a plurality of integrated packet optical network nodes 104. Packet optical network 102 is configured to support transporting both optical data and packet switching data. Packet optical network 102 is configured to implement the network configurations to configure flow paths or virtual connections between client 124, client 126, and service provider 122 via the integrated packet optical network nodes 104. A network configuration for the integrated packet optical network nodes 104 may be obtained from design server 106.

Integrated packet optical network nodes 104 are reconfigurable hybrid switches configured for packet switching and optical switching. In an embodiment, integrated packet optical network nodes 104 comprises a packet switch, an optical data unit (ODU) cross-connect, and a reconfigurable optical add-drop multiplex (ROADM). The integrated packet optical network nodes 104 are coupled to each other and to other network elements using virtual links 152 and physical links 150. For example, virtual links 152 may be logical paths between integrated packet optical network nodes 104 and physical links 150 may be optical fibers that form an optical wavelength division multiplexing (WDM) network topology. Virtual link 150 may also be referred to as a packet reachability graph (PRG) link. The integrated packet optical network nodes 104 may be coupled to each other using any suitable virtual links or physical links as would be appreciated by one of ordinary skill in the art upon viewing this disclosure. The integrated packet optical network nodes 104 may be coupled to one or more network elements 108-120 using optical fiber links. The integrated packet optical network nodes 104 may consider the network elements 108-120 as dummy terminals (DTs) that represent service and/or data traffic origination points and destination points.

Network elements 108-120, 128, and 130 may include, but are not limited to, clients, servers, broadband remote access servers (BRAS), switches, routers, service router/provider edge (SR/PE) routers, digital subscriber line access multiplexer (DSLAM) optical line terminal (OTL), gateways, home gateways (HGWs), service providers, providers edge (PE) network nodes, customers edge (CE) network nodes, an Internet Protocol (IP) router, and an IP multimedia subsystem (IMS) core.

Design server 106 is configured to obtain network information manually or automatically and to generate packet reachability graphs based on the network information. Examples of methods for obtaining network information includes, but is not limited to, control communication channels. Further, design server 106 is configured to generate a packet transport design and an optical transport design for a network configuration based on the packet reachability graph. The design server 106 is configured to determine if the network configuration is acceptable. The design server 106 is configured to output the network configuration. The network configuration may be outputted and/or used to configure the packet optical network 102.

Figure 2:
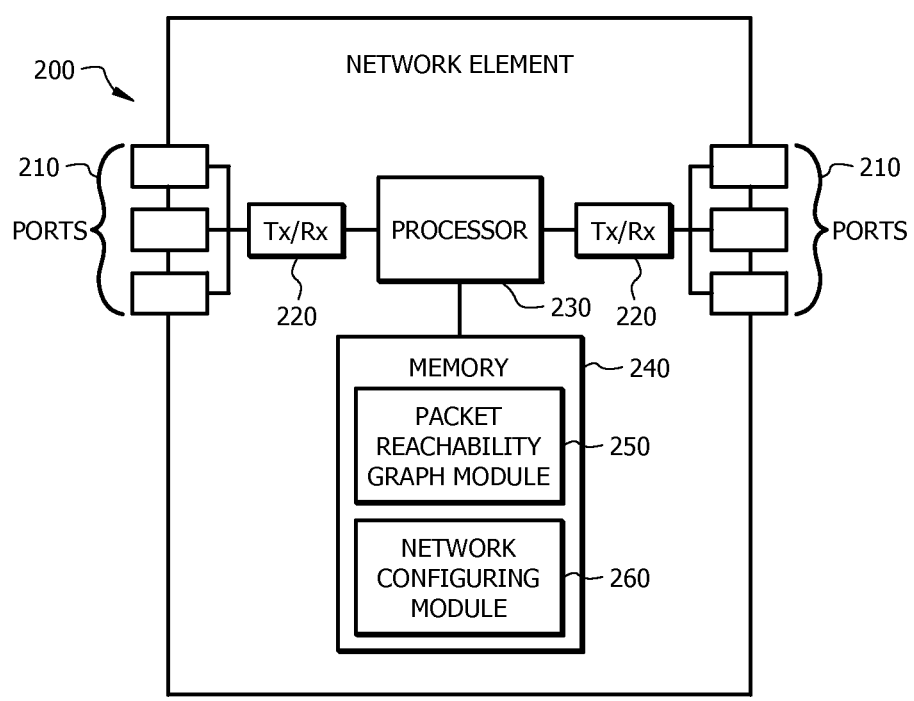
FIG. 2 is a schematic diagram of an embodiment of a network element.

FIG. 2 is a schematic diagram of an embodiment of a network element 200. The network element 200 may be suitable for implementing the disclosed embodiments. Network element 200 may be any device (e.g., a modem, a switch, router, bridge, server, client, controller, etc.) that transports or assists with transporting data through a network, system, and/or domain. For example, network element 200 may be implemented in design server 106, network elements 108, 110, 112, 114, 116, 118, 120, 128, and 130, service provider 122, or clients 124 and 126 in FIG. 1. Network element 200 comprises ports 210, transceiver units (Tx/Rx) 220, a processor 230, and a memory 240 comprising a packet reachability graph module 250 and a network configuring module 260. The processor 230 is coupled to the memory 240 and to the Tx/Rx 220. Ports 210 are coupled to Tx/Rx 220, which may be transmitters, receivers, or combinations thereof. The Tx/Rx 220 may transmit and receive data via the ports 210. Processor 230 is configured to process data. Memory 240 is configured to store data and instructions for implementing embodiments described herein. The network element 200 may also comprise electrical-to-optical (EO) components and optical-to-electrical (OE) components coupled to the ports 210 and Tx/Rx 220 for receiving and transmitting electrical signals and optical signals.

The processor 230 may be implemented by hardware and software. The processor 230 may be implemented as one or more central processing unit (CPU) chips, logic units, cores (e.g., as a multi-core processor), field-programmable gate arrays (FPGAs), application specific integrated circuits (ASICs), and digital signal processors (DSPs). The processor 230 is in communication with the ports 210, Tx/Rx 220, and memory 240.

The memory 240 comprises one or more of disks, tape drives, and solid-state drives and may be used as an overflow data storage device, to store programs when such programs are selected for execution, and to store instructions and data that are read during program execution. The memory 240 may be volatile and non-volatile and may be read-only memory (ROM), random-access memory (RAM), ternary content-addressable memory (TCAM), and static random-access memory (SRAM). The packet reachability graph module 250 and network configuring module 260 comprise programming or routines capable of being executed by the processor 230. Packet reachability graph module 250 is implemented by processor 230 to execute the instructions for obtaining network information and generating packet reachability graphs based on the network information. Network configuring module 260 is implemented by processor 230 to execute the instructions for obtaining or generating a packet reachability graph for a network, generating a packet transport design and an optical transport design for a network based on the packet reachability graph (PRG), determining if the network configuration is acceptable, and outputting the network configuration. The inclusion of packet reachability graph (PRG) module 250 and network configuring module 260 provides an improvement to the functionality of network element 200. The packet reachability graph module 250 and network configuring module 260 also effects a transformation of network element 200 to a different state. Alternatively, packet reachability graph module 250 and/or network configuring module 260 are implemented as instructions stored in the processor 230.

Figure 3:
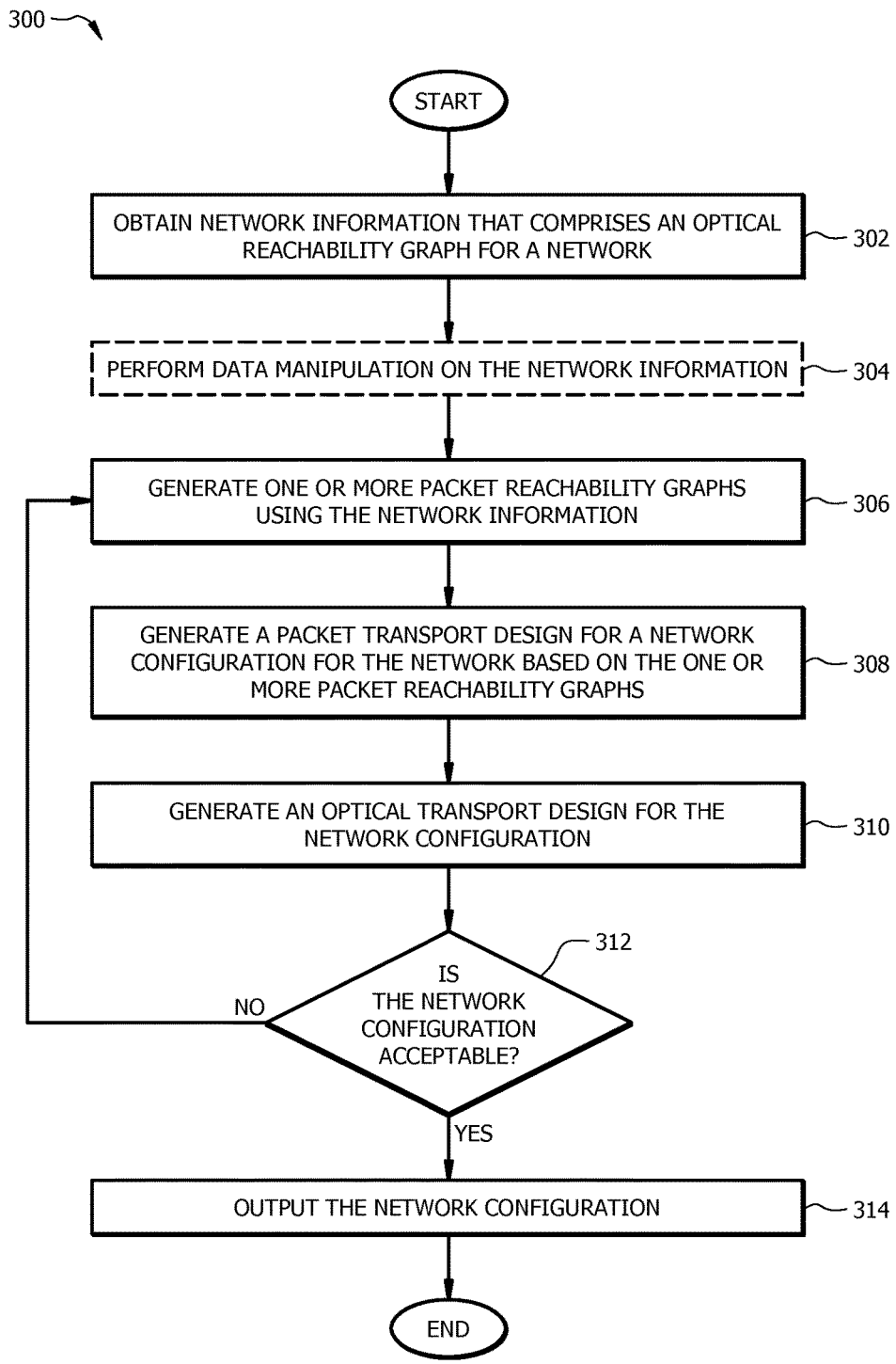
FIG. 3 is a flowchart of an embodiment of a packet optical network designing and configuring method.

FIG. 3 is a flowchart of an embodiment of a packet optical network designing and configuring method 300. Method 300 is implemented in a server or other computing device to configure a packet optical network. For example, method 300 may be implemented when a packet optical network is configured or reconfigured to provide optical and/or packet services. The server implementing the method 300 may be configured similarly to design server 106 in FIG. 1.

At step 302, the server obtains network information comprising an optical reachability graph for a network. Network information may comprise fiber topology and site information, traffic flow information, and network timing information. Fiber topology and site information may include, but is not limited to, the optical reachability graph for the network, site specifications, fiber specifications, and network element specifications. Traffic flow information may include, but is not limited to, traffic flow type, traffic flow bearer type, traffic flow bandwidth profile, traffic flow protection profile, traffic flow routing constraints, traffic flow quality of service (QoS) requirements, and traffic flow operations, administration, and management (OAM) requirements. For example, traffic flow type may include, but is not limited to, Ethernet virtual private line (E-line), Ethernet virtual private local area network (E-LAN), and Ethernet virtual private tree (E-tree). Network timing information may include, but is not limited to, network timing system information. The optical reachability graph for the network is a representation that considers transmission impairments for a given physical fiber network and optical components configuration.

Optionally, at step 304, the server performs data manipulations on the network information. For example, the server combines and/or manipulates the network information into one or more data structures for generating a packet optical network configuration.

At step 306, the server generates one or more packet reachability graphs using the network information. The server generates the packet reachability graphs based on the network information using software-defined configurations from autonomous software modeling or using manual configurations from user defined configurations. In a software defined configuration, the packet reachability graph can be automatically created on top of the optical reachability graph based on given traffic distribution patterns, site configurations, and packet-layer protection and traffic engineering rules. A manual configuration may be employed when a user is clear about the packet traffic aggregation and grooming relationships. The user-defined topology may be based on the user's policy and engineering rules. For example, a manual configuration may be a tree-like packet reachability graph for wireless backhaul applications in a metro packet optical transport network because of low-latency transport requirements. A packet reachability graph may be similar to packet reachability graph 700 in FIG. 7, packet reachability graph 800 in FIG. 8, or packet reachability graph 900 in FIG. 9.

At step 308, the server generates a packet transport design for a network configuration for the network based on the one or more packet reachability graphs. Generating a packet transport design comprises using the one or more packet reachability graphs to dimension packet layer resources including, but not limited to, packet user-network interface (UNI) links, packet NNI links, virtual local area networks (VLANs), protection groups, pseudo-wires (PWs), open systems interconnection (OSI) Layer 2 (L2) tunnels (e.g., multi-protocol label switching (MPLS) tunnels), and virtual switch instances (VSIs).

At step 310, the server generates an optical transport design for the network configuration. Generating an optical transport design comprises mapping the dimensioned packet layer resources into the physical WDM-based fiber topology, determining a set of viable physical paths or bandwidth pipes (e.g., optical channel (OCH)/optical channel data unit (ODU)/virtual circuit (VC)) in the network, and determining whether network equipment meets the capacity requirements. The network configuration comprises the packet transport design and the optical transport design which may combine to form of a network topology, a sub-rack diagram, bill of quantities (BoQ)/bill of materials (BoM), link utilization report, or any other suitable representation as would be appreciated by one of ordinary skill in the art upon viewing this disclosure.

At step 312, the server determines whether the network configuration is acceptable based on predefined user objectives. Predefined user objectives may include, but are not limited to, network engineering rules, performance metrics, service level agreement (SLA) constraints, a cost threshold, a QoS threshold, a bandwidth threshold, a capacity threshold, any other user objective as would be appreciated by one of ordinary skill in the art upon viewing this disclosure, or combinations thereof. In an embodiment, the server determines whether the network configuration meets one or more of the predefined user objectives and determines that the network configuration is acceptable when the network configuration meets the one or more of the predefined user objectives. For example, the server may compare the total cost of the network configuration to a cost threshold and the network configuration is acceptable when the total cost of the network configuration is less than the cost threshold. The server determined that the network configuration is unacceptable when the network configuration fails to meet the one or more predefined user objectives. When the server determines that the network configuration is acceptable the server proceeds to step 314. Otherwise, the server proceeds to step 306.

At step 314, the server outputs the network configuration. A network configuration output may include, but is not limited to, one or more of a table, a schematic, a diagram, a word document, a data file, or a network configuration file. For example, a network configuration file may be used by a packet optical network to configure the packet optical network. Configuring the packet optical network may comprise establishing and configuring flow paths through the packet optical network.

Figure 4:
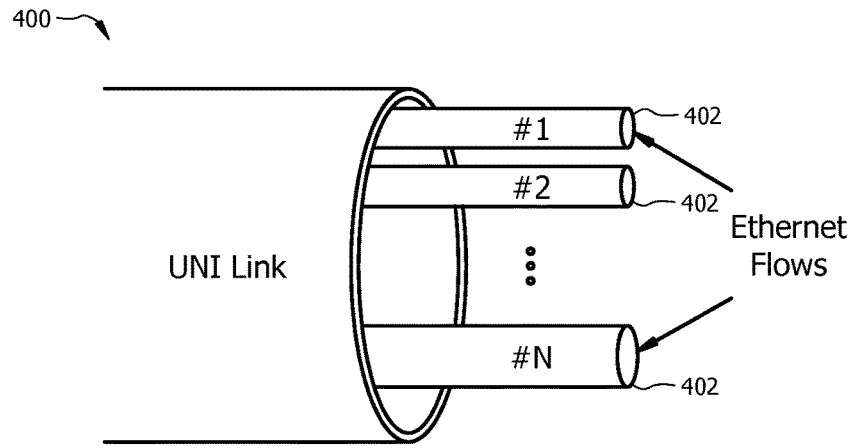
FIG. 4 is a cutaway diagram of an embodiment of a packet reachability graph link instance for a packet reachability graph.

FIG. 4 is a cutaway diagram of an embodiment of a PRG link instance 400 for a packet reachability graph. PRG link instance 400 is configured as a UNI link that is used to directly carry a customer's packet traffic flow. PRG link instance 400 comprises a plurality of Ethernet flows 402. The plurality of Ethernet flows can share one UNI link simultaneously using statistics multiplexing. A PRG link instance 400 configured as a UNI link may be associated with a VLAN identifier (ID).

Figure 5:
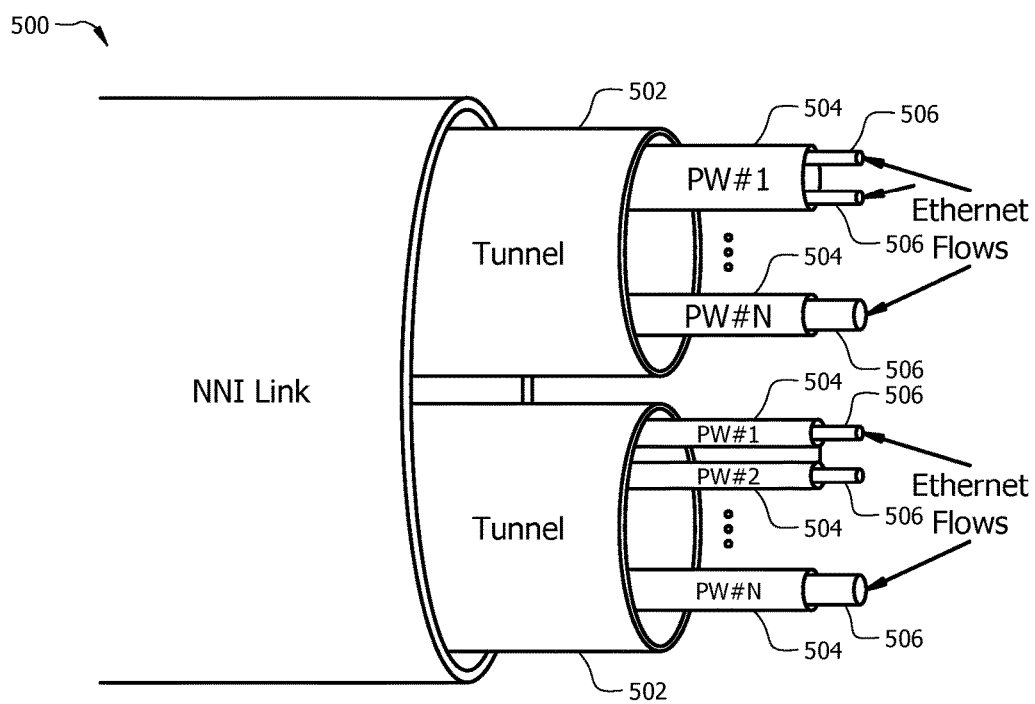
FIG. 5 is cutaway diagram of another embodiment of a packet reachability graph link instance for a packet reachability graph.

FIG. 5 is cutaway diagram of another embodiment of a PRG link instance 500 for a packet reachability graph. The PRG link instance 500 may be, for example, similar to the virtual link 150 in FIG. 1. PRG link instance 500 may be implemented in a packet reachability graph, for example, packet reachability graph 700 in FIG. 7, packet reachability graph 800 in FIG. 8, or packet reachability graph 900 in FIG. 9. The PRG link instance 500 in the example is configured as an NNI link that is used to carry packet specific transport entities over lower layer optical circuits, for example, ODU/OCH. PRG link instance 500 comprises tunnels 502. Each tunnel 502 comprises PWs 504 and each PW 504 carries an Ethernet flow 506. Table 1 is an embodiment of a data structure for a PRG link such as PRG link instance 400 in FIG. 4 and PRG link instance 500 in FIG. 5.

TABLE 1

An embodiment of a data structure for a PRG link

```
typedef struct _PRG_LINK
{
    int LinkID;        // link identification
    int NodeA;         // source node ID
    int NodeB;         // sink node ID
    int LinkEncapType; //packet link encapsulation techniques, e.g., 802.1q, QinQ, MPLS-TP, etc.
    int LinkPhysicalType; //packet link bearer techniques, e.g., ODUk, OCH, VC, Fiber, etc.
    int LinkRate;      //data rate, e.g.,100M,1G,10G,40G,100G, or any others
    int NewLinkCost;   //actual cost of associated line cards for a new packet link, e.g., 1000
    int AdminCost;     // administrative cost,
    int LinkDistance;  // link distance (unit: Km), can be null
    int LinkWeight;    // link weight, can be any one of the above three
    int LinkAvailableBW; //available bandwidth (unit: Mb/s)
    int ProtectionGroupID; //assigned protection group (e.g., ERPS, LAG) and it can be empty
    double ServiceRatio; // traffic aggregation ratio or traffic oversubscription ratio, default = 1.0
    int LinkQoS;       //link bandwidth management mechanism, e.g., WFQ, RED
```

TABLE 1-continued

An embodiment of a data structure for a PRG link

```
    int MaxNum; // maximum number of UNI/NNI links which can be created
    std::list<int> PhyRoute; // user specified physical route which can be empty
    std::list<int> SRLGList; //SRLG description
    std::list<int> CarriedServiceList; // carried service list which may be empty
} PRG_LINK;
```

Figure 6:
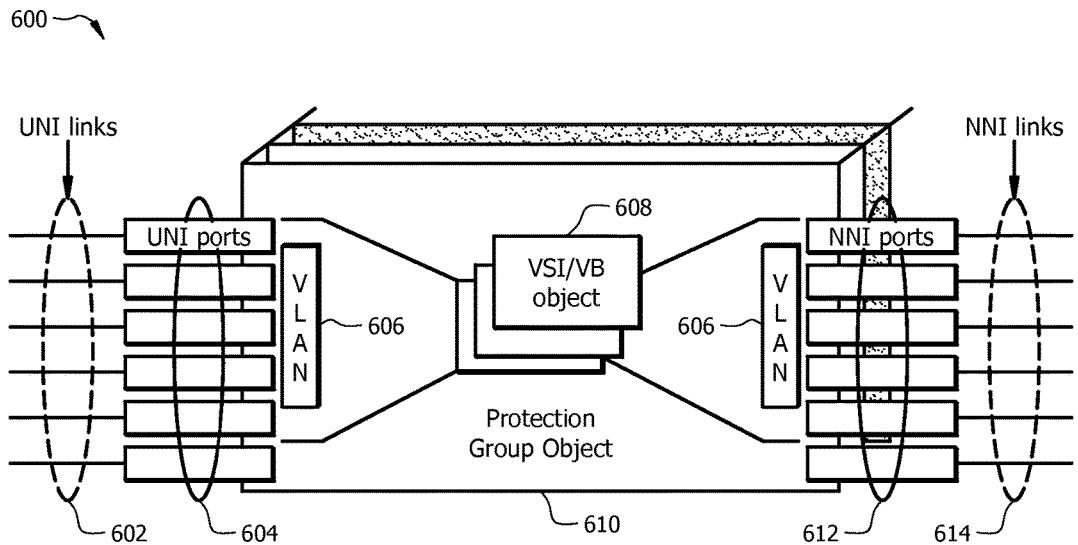
FIG. 6 is a schematic diagram of an embodiment of a packet reachability graph node instance for a packet reachability graph.
Figure 10:
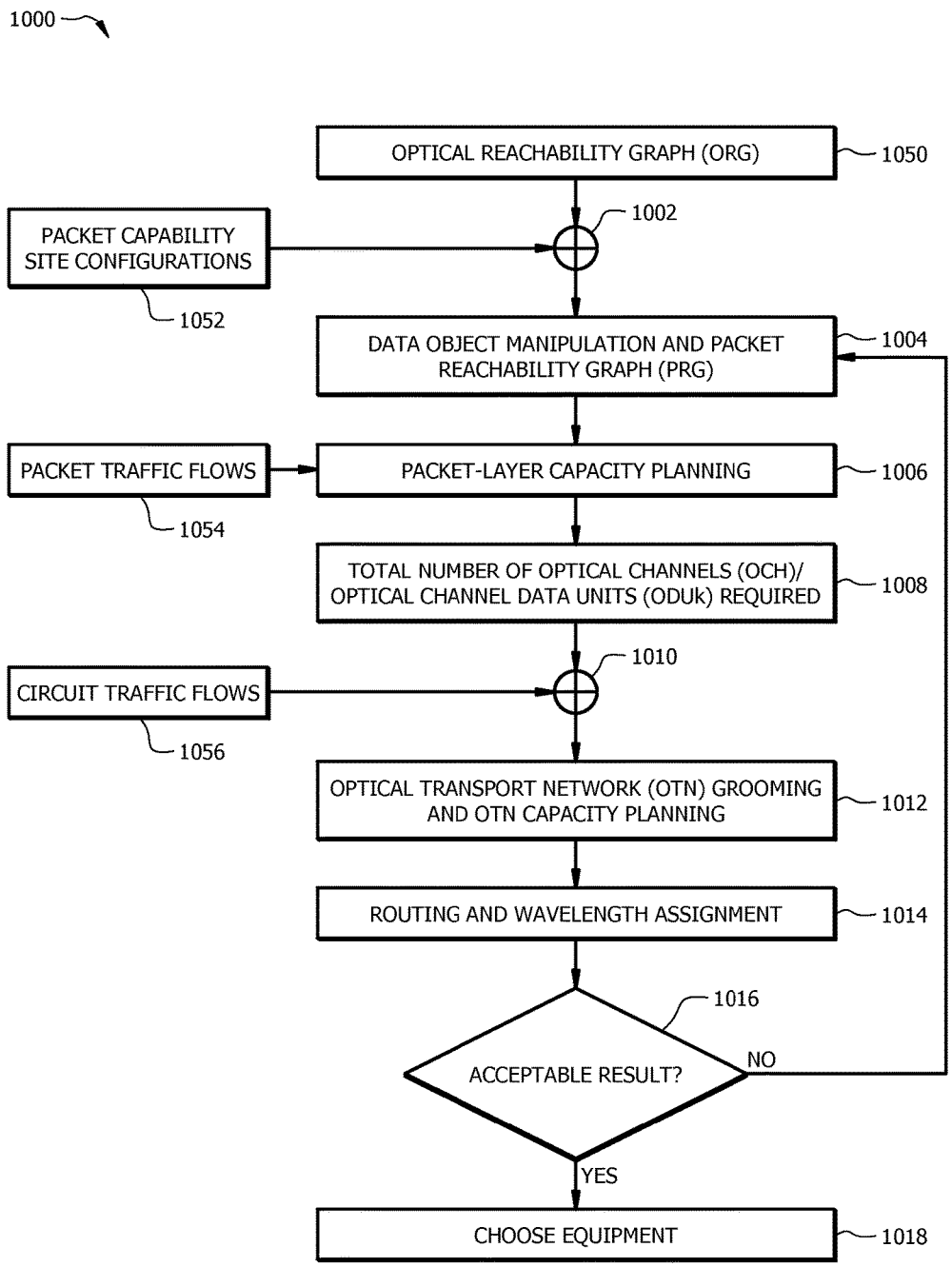
FIG. 10 is a flowchart of another embodiment of a packet optical network designing method.
Figure 16:
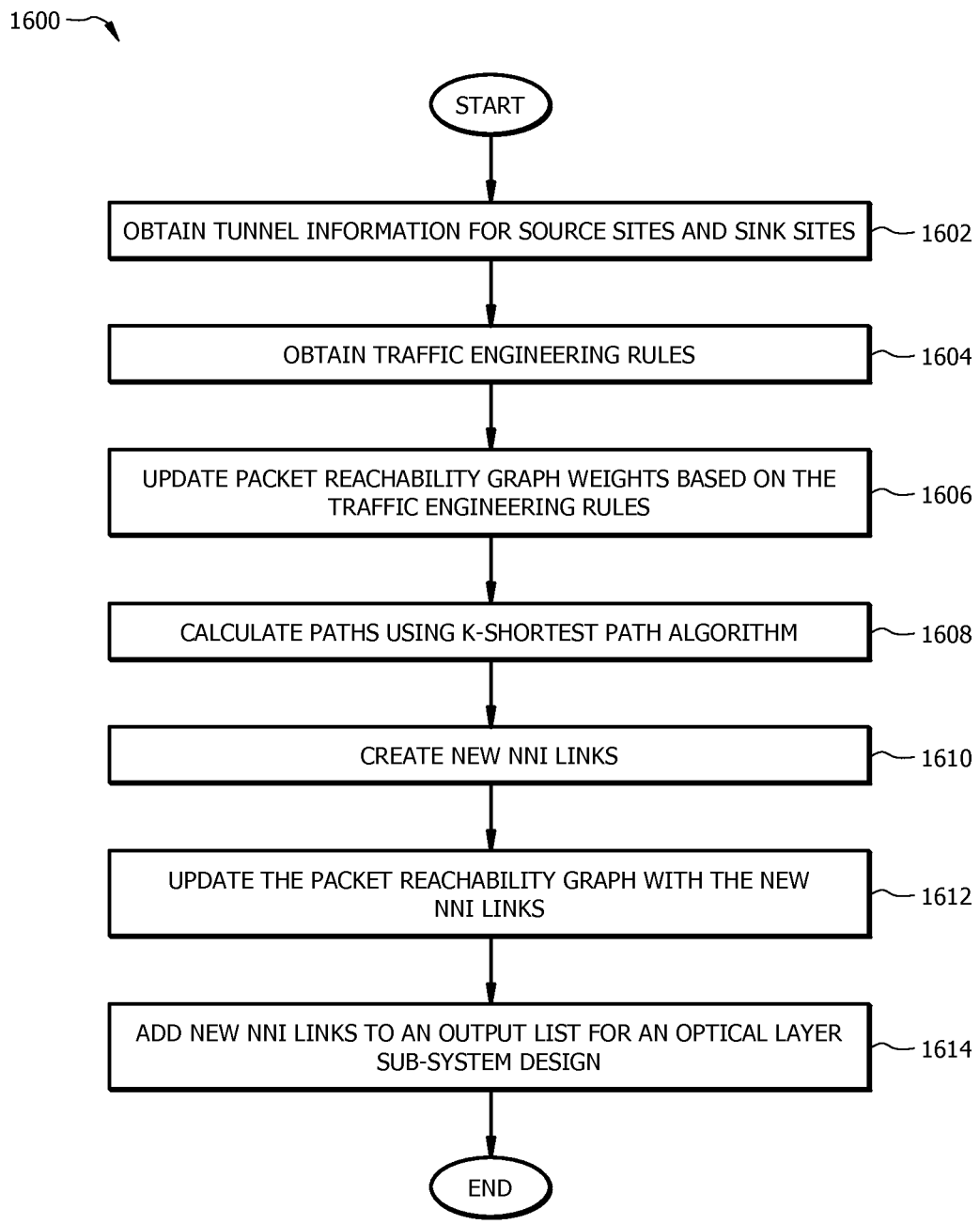
FIG. 16 is a flowchart of an embodiment of a network-to-network interface link resource dimensioning method.

FIG. 6 is a schematic diagram of an embodiment of a PRG node instance 600 for a packet reachability graph. PRG node instance 600 may define an implementation of a PRG node in a packet reachability graph, for example, packet reachability graph 700 in FIG. 7, packet reachability graph 800 in FIG. 8, or packet reachability graph 900 in FIG. 9. PRG node instance 600 is modeled using sub-objects including, but not limited to, VLANs 606, virtual switches 608, and protection groups 610. A virtual switch 608 may be configured as a VSI or virtual bridge (VB). For example, a VB may be configured to use encapsulation methods such as Institute of Electrical and Electronics Engineers (IEEE) 802.1q (i.e., VLAN) or IEEE 802.1ad (QinQ) and forwarding methods such as media access control (MAC)-based SVL/VLAN+ MAC-based independent VLAN learning (IVL). A PRG node instance 600 is configured to attach to UNI links 602 and NNI links 614 using UNI ports 604 and NNI ports 612, respectively. Table 2 is an embodiment of a data structure for a PRG node such as PRG node instance 600 in FIG. 6.

optical network configuring method 1000 in FIG. 10, or network-to-network interface resource dimensioning method 1600 in FIG. 16.

Packet reachability graph 700 may be referred to as a single-stage PRG which may be useful for a network with large-bandwidth granularity packet flow aggregation or for low-latency applications. In a single-stage PRG, the PRG nodes 702, 704, 706, 708, 710, and 712 that are configured to interface between a packet optical network and a service provider are a single hop away from each of the PRG nodes 702-712 in the packet optical network. The packet reachability graph 700 may be configured as shown or any other suitable configuration.

Packet reachability graph 700 may be used to describe a packet optical network configuration for configuring integrated packet optical network nodes in a packet optical network, for example, integrated packet optical network nodes 104 in packet optical network 102 in FIG. 1. Packet reachability graph 700 is a packet abstraction layer network

TABLE 2

An embodiment of a data structure for a PRG node

```
typedef struct _PRG_NODE
{
    int    NodeID; // node identification
    int    DualHomeNodeID; // dual-homed node ID if any
    int    NodeType; // node type such as dumb terminal or abstracted packet switch
    int    SiteID; // belonged site ID
    std::list<int> PRG_Link_List; //associated PRG links including "potential" PRG links
        and existing packet links
    int    SwitchingCapacity; //node packet grooming capacity
    int    maxAllowedPWNum; // maximum number of pseudo-wire allowed
    int    maxAllowedTunnelNum;// maximum number of tunnel allowed
    int    maxAllowedAPSNum; // maximum number of APS protection group allowed
    int    maxCVLANNum; // maximum number of client VLAN allowed
    int    maxSVLANNum; // maximum number of service VLAN allowed
    int    maxERPSNum; // maximum number of ERPS protection group allowed
    int    maxE-LINENum; // maximum number of E-Line objects (e.g., VPWS) allowed
    int    maxE-LANNum; // maximum number of E-Lan objects (e.g., VSI,VB) allowed
} PRG_NODE
```

Figure 7:
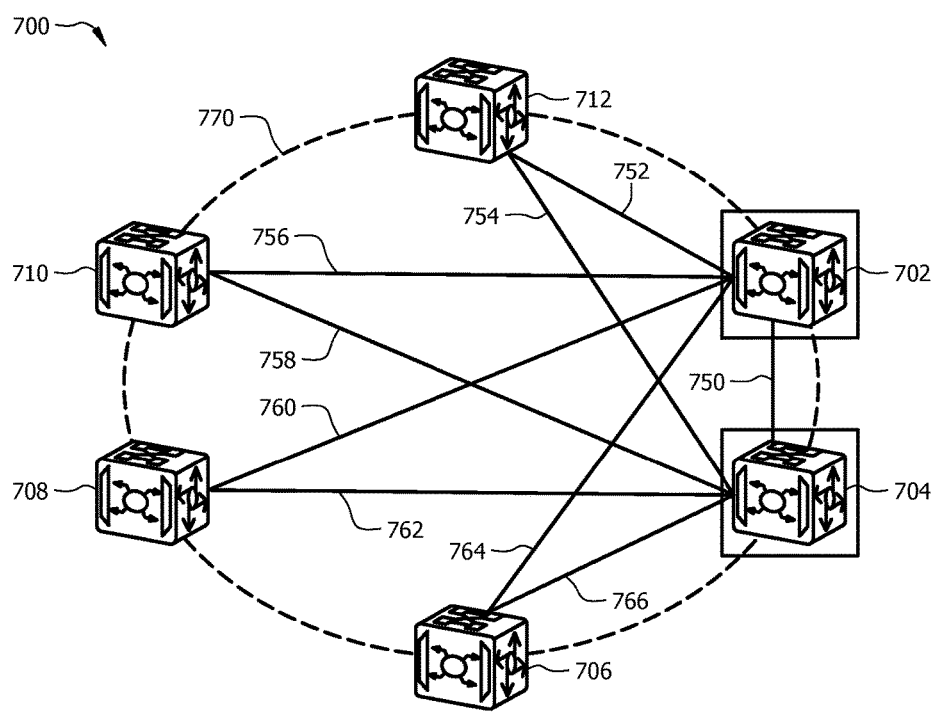
FIG. 7 is a schematic diagram of an embodiment of a packet reachability graph.

FIG. 7 is a schematic diagram of an embodiment of a packet reachability graph 700. A packet reachability graph uses a bottom-up methodology to abstract a packet forwarding topology from the physical optical transport substrate. The packet reachability graph converts various types of physical fiber networks into a transmission-capability aware logical packet topology. A packet reachability graph can be formed into different configurations for the same packet optical transport network. The configurations of the packet reachability graph may depend on factors such as application scenarios, design rules, traffic distributions, and optical transmission impairments. Packet reachability graph 700 is used to configure a packet optical network, such as the packet optical network 102 in FIG. 1. For example, packet reachability graph 700 may be implemented in packet optical network configuring method 300 in FIG. 3, packet that comprises PRG nodes 702-712. PRG nodes 702-712 may be configured similarly to PRG node instance 600 in FIG. 6. PRG nodes 702 and 704 are each configured to communicate data between the PRG nodes 702-712 and a service provider (not shown). PRG nodes 702-712 are coupled to each other using a fiber topology 770 and PRG links 750, 752, 754, 756, 758, 760, 762, 764, and 766. Fiber topology 770 is a fixed fiber optic connection topology among the PRG nodes 702-712. PRG links 750-766 may be NNI links and may be configured similarly to PRG link instance 500 in FIG. 5. PRG node 702 is connected to PRG node 704 using PRG link 750, to PRG node 712 using PRG link 752, to PRG node 710 using PRG link 756, to PRG node 708 using PRG link 760, and to PRG node 706 using PRG link 764. PRG node 704 is connected to PRG node 712 using PRG link 754, to PRG node 710 using PRG link 758, to PRG node 708 using PRG link 762, and to PRG node 706 using PRG link 766.

Figure 8:
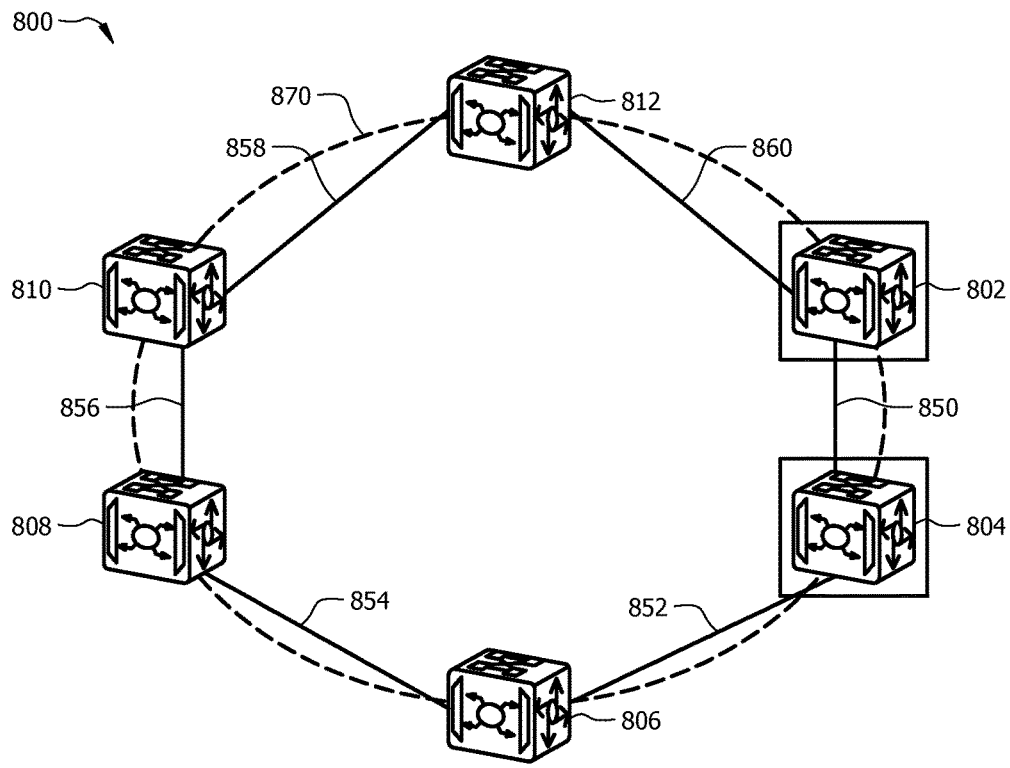
FIG. 8 is a schematic diagram of another embodiment of a packet reachability graph.

FIG. 8 is a schematic diagram of another embodiment of a packet reachability graph 800. Packet reachability graph 800 may be referred to as a multi-stage PRG which may be useful for networks with a fine-granularity service connectivity with multicasting traffic flow distributions, for example, for video distribution services. In a multi-stage PRG, the PRG nodes 802, 804, 806, 808, 810, and 812 may be more than a single hop away from each of the PRG nodes 802-812 in the packet optical network. The packet reachability graph 800 may be configured as shown or any other suitable configuration. Packet reachability graph 800 may be implemented in packet optical network configuring method 300 in FIG. 3, packet optical network configuring method 1000 in FIG. 10, or network-to-network interface resource dimensioning method 1600 in FIG. 16.

Packet reachability graph 800 may be used to describe a packet optical network configuration for configuring integrated packet optical network nodes in a packet optical network, for example, integrated packet optical network nodes 104 in packet optical network 102 in FIG. 1. Packet reachability graph 800 is a packet abstraction layer network that comprises PRG nodes 802, 804, 806, 808, 810, and 812. PRG nodes 802-812 may be configured similarly to PRG node instances 600 in FIG. 6. PRG nodes 802 and 804 are each configured to communicate data between the PRG nodes 802-812 and a service provider (not shown). PRG nodes 802-812 are coupled to each other using a fiber topology 870 and PRG links 850, 852, 854, 856, 858, and 860. Fiber topology 870 is a fixed fiber optic connection topology among the PRG nodes 802-812. PRG links 850-860 may be NNI links and may be configured similarly to PRG link instance 500 in FIG. 5. In FIG. 8, PRG nodes 802-812 are configured in a ring topology.

Figure 9:
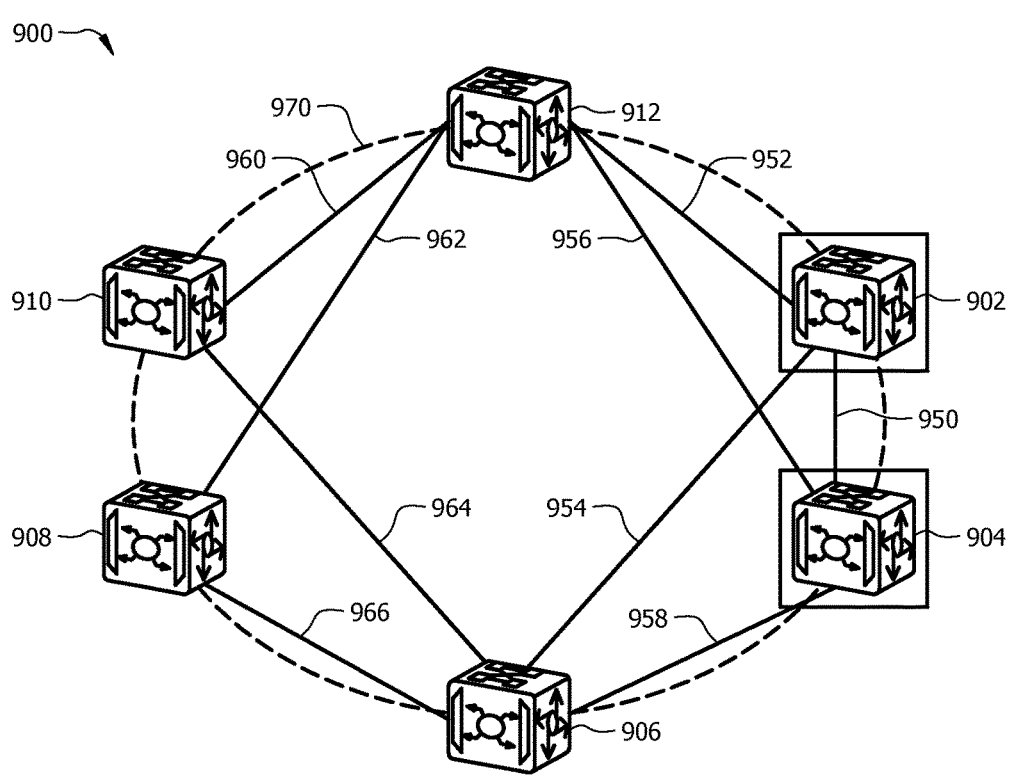
FIG. 9 is a schematic diagram of another embodiment of a packet reachability graph.

FIG. 9 is a schematic diagram of another embodiment of a packet reachability graph 900. Packet reachability graph 900 is a software-defined packet reachability graph that may be generated based on factors such as application scenarios, design rules, traffic distributions, and optical transmission impairments. For example, packet reachability graph 900 may be an optimal packet forwarding topology that is generated automatically based on a given packet flow matrix which may include VLAN services and optical transmission impairments. The packet reachability graph 900 may be configured as shown or any other suitable configuration. Packet reachability graph 900 may be implemented in packet optical network configuring method 300 in FIG. 3, packet optical network configuring method 1000 in FIG. 10, or network-to-network interface resource dimensioning method 1600 in FIG. 16.

Packet reachability graph 900 may be used to describe a packet optical network configuration for configuring integrated packet optical network nodes in a packet optical network, for example, integrated packet optical network nodes 104 in packet optical network 102 in FIG. 1. Packet reachability graph 900 is a packet abstraction layer network that comprises PRG nodes 902, 904, 906, 908, 910, and 912. PRG nodes 902-912 may be configured similarly to PRG node instance 600 in FIG. 6. PRG nodes 902 and 904 are each configured to communicate data between the PRG nodes 902-912 and a service provider (not shown). PRG nodes 902-912 are coupled to each other using a fiber topology 970 and PRG links 950, 952, 954, 956, 958, 960, 962, 964, and 966. Fiber topology 970 is a fixed fiber optic connection topology among the PRG nodes 902-912. PRG links 950-966 may be NNI links and may be configured similarly to PRG link instance 500 in FIG. 5. PRG links 950-966 may couple the PRG nodes 902-912 together using a combination of single-hop and multi-hop connections.

FIG. 10 is a flowchart of another embodiment of a packet optical network designing method 1000. Method 1000 is implemented in a server to design a packet optical network. For example, a server may be configured similarly to design server 106 in FIG. 1. The server implements method 1000 to generate and implement a network configuration for a packet optical network. The server uses various inputs to perform packet layer capacity planning in order to plan packet NNI links between different sites across a network. The server also maps the packet NNI link resource into the optical layer topology, determines the set of viable optical paths in the network and the network equipment that meet the service requirements, and looks up the best path with minimal cost for that service. Method 1000 enables the server to accommodate a multi-layer network design to support various application scenarios, which increases the extensibility and the agility of a network design process. A multi-layer network design may support open system interconnection (OSI) model layer 0 (L0), layer 1 (L1), layer 2 (L2), and multi-service optical transport network layers.

At step 1002, the server obtains an optical reachability graph 1050 and packet capability site configurations 1052. The optical reachability graph 1050 may provide information about optical transmission impairments, optical transmission costs, and optical physical fiber topology, for example. The optical reachability graph 1050 may provide information about a physical topology (e.g., fiber optic topology) for a plurality of integrated packet optical network nodes in a packet optical network, for example, the integrated packet optical network nodes 104 in packet optical network 102 in FIG. 1. In an embodiment, the optical reachability graph 1050 is provided by a client or a service provider that is coupled to a packet optical network. Packet capability site configurations 1052 may include information including, but not limited to, site capability specifications, fiber specifications, network element specifications, traffic flow types, traffic flow bearer types, traffic bandwidth profiles, traffic protection profiles, traffic flow routing constraints, traffic flow QoS requirements, traffic flow OAM requirements, and network timing information.

At step 1004, the server performs data object manipulations on the optical reachability graph and the packet capability site configurations to generate one or more packet reachability graphs. Data object manipulations may include, but are not limited to, using WDM fiber topologies, traffic flow matrixes, UNI port assignments, or any other data object as would be appreciated by one of ordinary skill in the art upon viewing this disclosure to generate a packet reachability graph. A packet reachability graph may be configured similar to packet reachability graph 700 in FIG. 7, packet reachability graph 800 in FIG. 8, or packet reachability graph 900 in FIG. 9. The packet reachability graphs may be generated manually or autonomously using software. In an embodiment, the server uses the packet capability site configurations to autonomously generate a single-stage packet reachability graph, a multi-stage packet reachability graph, and a software-defined packet reachability graph.

At step 1006, the server obtains packet traffic flows 1054 and performs packet layer capacity planning using the packet reachability graph. Packet layer capacity planning may comprise determining a UNI/NNI link design, selecting a traffic bearer, determining a VSI/VB design, determining a VLAN design, determining a protection design, planning PWs and tunnels, and determining tunnel route designs. At step 1008, the server determines a total number of optical channels and optical channel data units that are required based on the packet reachability graph and the packet layer capacity planning.

At step 1010, the server obtains circuit traffic flows 1056 such as TDM traffic flows. At step 1012, the server performs optical transport network grooming and optical transport network capacity planning. Optical transport network grooming and optical transport network capacity planning may comprise optical-layer equipment dimensioning, sub-rack dimensioning, line card dimensioning, UNI/NNI port dimensioning, and fiber route planning. At step 1014, the server determines routing and wavelength assignments to generate a network configuration. At step 1016, the server determines whether the network configuration is acceptable, as previously discussed in step 312 of FIG. 3. The server proceeds to step 1018 when the network configuration is acceptable. Otherwise, the server returns to step 1004 to generate one or more other packet reachability graphs. At step 1018, the server chooses equipment based on the network configuration.

Figure 11:
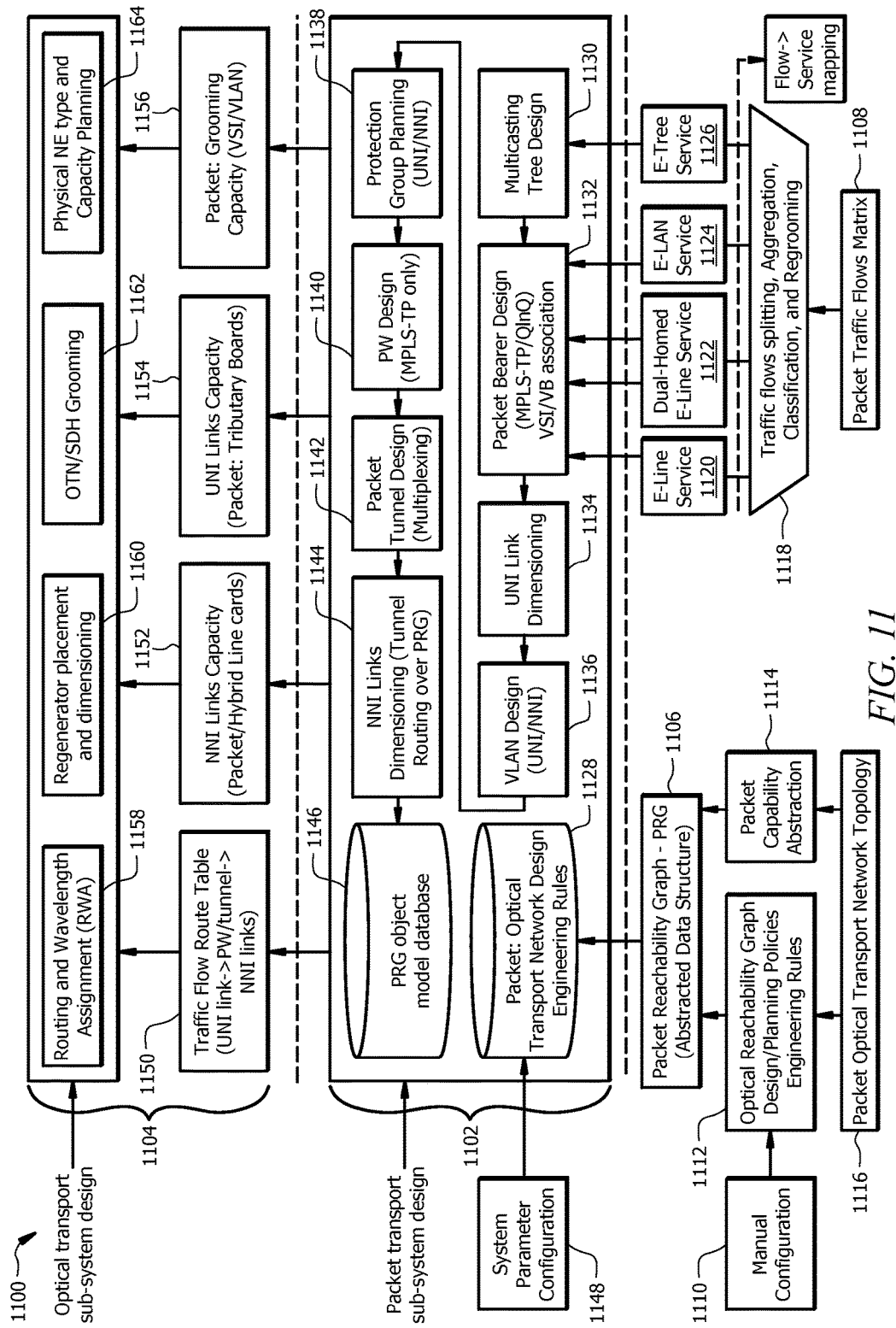
FIG. 11 is a schematic diagram of an embodiment of a software architecture for designing packet optical transport network resources.

FIG. 11 is a schematic diagram of an embodiment of a software architecture 1100 for designing packet optical transport network resources. For example, software architecture 1100 may be used in a packet optical network configuring method for performing optical transport network grooming and optical transport network capacity planning. The software architecture 1100 may be used for determining routing and wavelength assignments as part of generating a network configuration. Software architecture 1100 may be implemented in design server 106, network elements 108, 110, 112, 114, 116, 118, and 120, service provider 122, clients 124 and 126 in FIG. 1, and a network element 200 in FIG. 2.

The software architecture 1100 comprises a packet transport sub-system design 1102 and an optical transport sub-system design 1104. The packet transport sub-system design 1102 is responsible for dimensioning the packet layer capacity (e.g., the set of NNI links between each pair of PRG nodes) to be established in the network based on the aggregation of traffic flows such as E-line, E-LAN/VPLS, and E-tree services. The packet transport sub-system design 1102 uses a PRG abstracted data structure 1106, for example, a packet reachability graph, and a traffic flow matrix 1108 as inputs. The PRG abstracted data structure 1106 can be generated manually or autonomously using software. The PRG abstracted data structure 1106 may be generated using manual configurations 1110, optical reachability graph design and planning policies and engineering rules 1112, packet capability abstraction 1114, and packet optical transport network topology information 1116. Each traffic flow in the traffic flow matrix 1108 is mapped to a service category. The traffic flow matrix 1108 can be split (e.g., demultiplexed) into traffic flows, for example, for traffic flow splitting, aggregation, classification, and regrooming. For example, the traffic flow matrix 1108 may be split up into traffic flows using demultiplexer 1118 and the traffic flows are mapped to service categories for E-line services 1120, dual-homed E-line services 1122, E-LAN services 1124, and E-tree services 1126. Traffic flows can be automatically mapped into packet transport service categories based on predefined engineering rules. Predefined engineering rules may be programmable to meet various preferences. The packet transport sub-system design 1102 is configured to access or obtain system parameter configurations 1148 and packet optical transport network design engineering rules 1128. The packet optical transport network design engineering rules 1128 may comprise packet layer engineering rules.

The packet transport sub-system design 1102 uses information from the PRG abstracted data structure 1106 and the traffic flow matrix 1108 to generate a packet transport design. In an embodiment, the packet transport sub-system design 1102 comprises multicasting tree design 1130, packet bearer design 1132, UNI link dimensioning 1134, VLAN design 1136, protection group planning 1138, PW design 1140, packet tunnel design 1142, and NNI link dimensioning 1144. For example, the packet transport sub-system design 1102 begins at multicast tree design 1130 for a packet transport design for a video traffic flow. At packet bearer design 1132, the packet transport sub-system design 1102 selects a packet bearer technique, for example, MPLS-TP or native Ethernet QinQ. VSI/VB objects will be created or associated accordingly. At UNI link dimensioning 1134, UNI links will be dimensioned according to the traffic bandwidth profile and the UNI port specifications. Each traffic flow bandwidth profile comprises a committed information rate (CIR), an excess information rate (EIR), and a traffic burst ratio (TBR). In an embodiment, the TBR is a value between 0.0 and 1.0. The required bandwidth can be computed using the following formula:

$$\text{Bandwidth} = \text{CIR} + \text{EIR} * \text{TBR}. \quad (1)$$

The corresponding bandwidth will be reserved on the UNI link. At VLAN design 1136, the VLAN type and VLAN ID will be automatically assigned when the VLAN type and VLAN ID are not specified. At protection group planning 1138, protection techniques such as link aggregation group (LAG) will be selected taking into account service level agreements (SLAs). At PW design 1140, PWs are created or reuse existing ones based on packet layer engineering rules. Similarly, at packet tunnel design 1142, tunnels are created or reuse existing ones based on packet layer engineering rules. At NNI link dimensioning 1144, packet capacity planning is performed. New tunnels driven by traffic flows are routed over the PRG. New NNI links are created automatically when the new tunnels are unable to reuse existing NNI links. Packet transport designs may be saved in a PRG object model database 1146.

The optical transport sub-system design 1104 is configured to be responsible for dimensioning optical layer capacity driven by packet transport sub-system design 1102 outputs. The packet transport sub-system design 1102 outputs include, but are not limited to, a traffic flow route table 1150, NNI links capacity 1152, UNI links capacity 1154, and packet grooming capacity 1156. In the optical transport sub-system design 1104, transmission impairments are considered and NNI links can be carried in the optical layer as ODUk, OCH, VC, or any other suitable representation.

In an embodiment, the optical transport sub-system design 1104 comprises routing and wavelength assignment (RWA) module 1158, regenerator placement and dimensioning module 1160, OTN/SDH grooming module 1162, and physical network element (NE) type and capacity planning module 1164. Routing and wavelength assignment module 1158 is configured to accommodate the OCHs generated from OTN/SDH grooming module 1162. For example, routing and wavelength assignment module 1158 may be configured to determine a shortest path for an OCH, to assign wavelengths, and to rearrange existing OCHs to minimize the total number of transponders. Regenerator placement and dimensioning module 1160 is configured to be responsible for optical-electrical-optical (OEO) conversion resource dimensioning and sharing or centralization. OTN/SDH grooming module 1162 is configured to provide end-to-end sub-wavelength circuits. Physical NE type and capacity planning module 1164 is configured to partition the total capacity requirements such as packet UNI/NNI links, sub-wavelength grooming capacity, the number of regenerators. For example, the physical NE type and capacity planning module 1164 may partition a number of wavelengths in a site into many physical sub-racks so that each sub-rack can satisfy the designed functions by taking the electrical line cards limitation and sub-rack constraints (e.g., slots, power consumption, and fabric switching) into account.

FIGS. 12-15 are schematic diagrams of various embodiments of how client traffic flows are mapped to packet transport services and are transported over a packet transport services optical network. For example, client traffic may be mapped to form a connection between different UNI ports in PRG nodes. Different kinds of traffic flows are communicated from UNI ports such as Ethernet private line (EPL) which is port-based and Ethernet virtual private line (EVPL) which is port and virtual LAN-based. The traffic flows are assigned to a VLAN, mapped into different types of PWs and tunnels with different protection types (e.g., one primary path and one backup path with no traffic on the backup path (1:1), one primary path and one backup path with traffic on both the primary path and the backup path (1+1), or no protection), and transported over a packet optical transport network.

Figure 12:
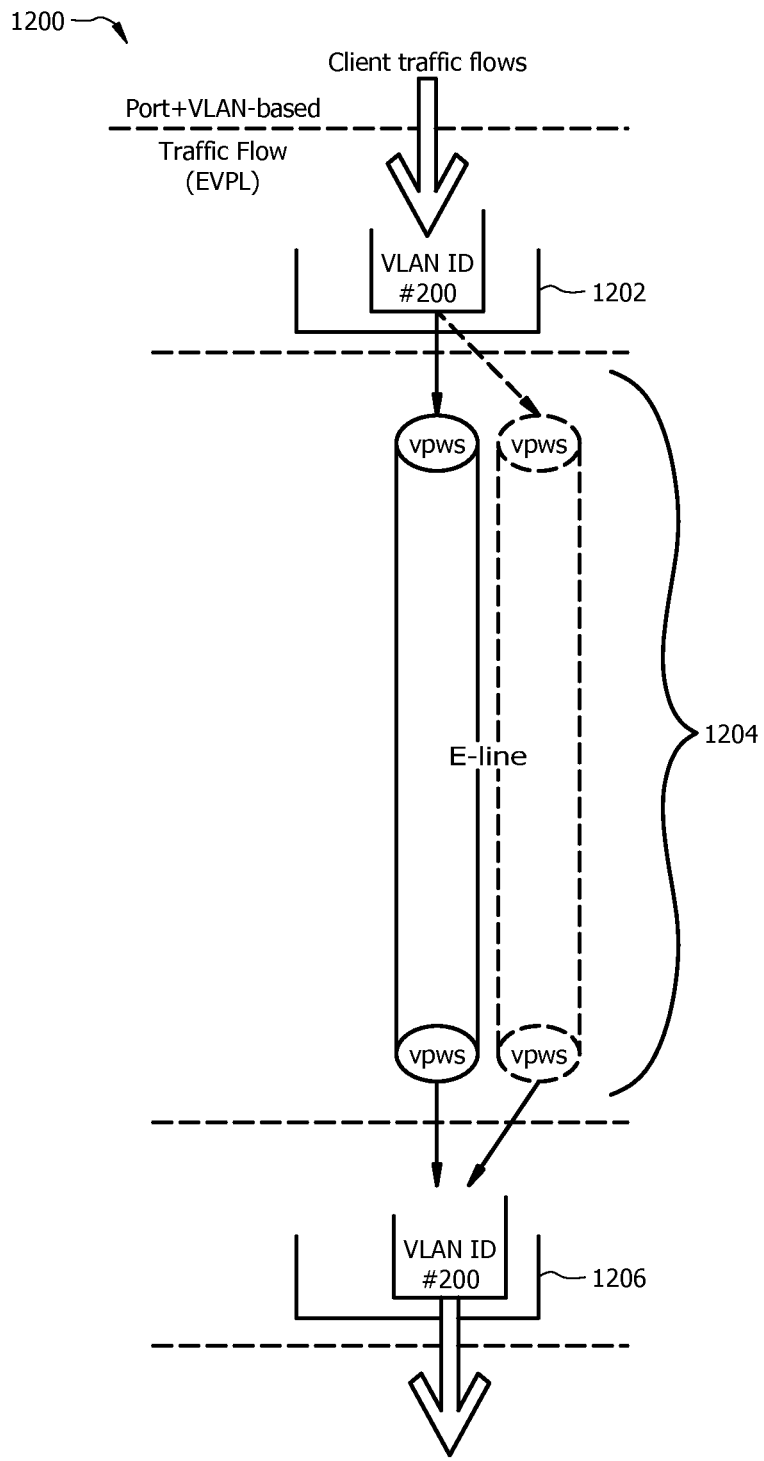
FIG. 12 is a schematic diagram of an embodiment of a traffic flow mapping using E-lines.

FIG. 12 is a schematic diagram of an embodiment of a traffic flow mapping 1200 using E-lines and transporting over a packet optical network. Traffic flow mapping 1200 communicates traffic flows from a first UNI port 1202 across a packet optical network 1204 using E-lines or virtual PW services to a second UNI port 1206. An E-line is configured to have one source PRG node and a sink PRG node. The first UNI port 1202 and the second UNI ports 1206 are configured as an EVPL for port and VLAN-based traffic flows.

Figure 13:
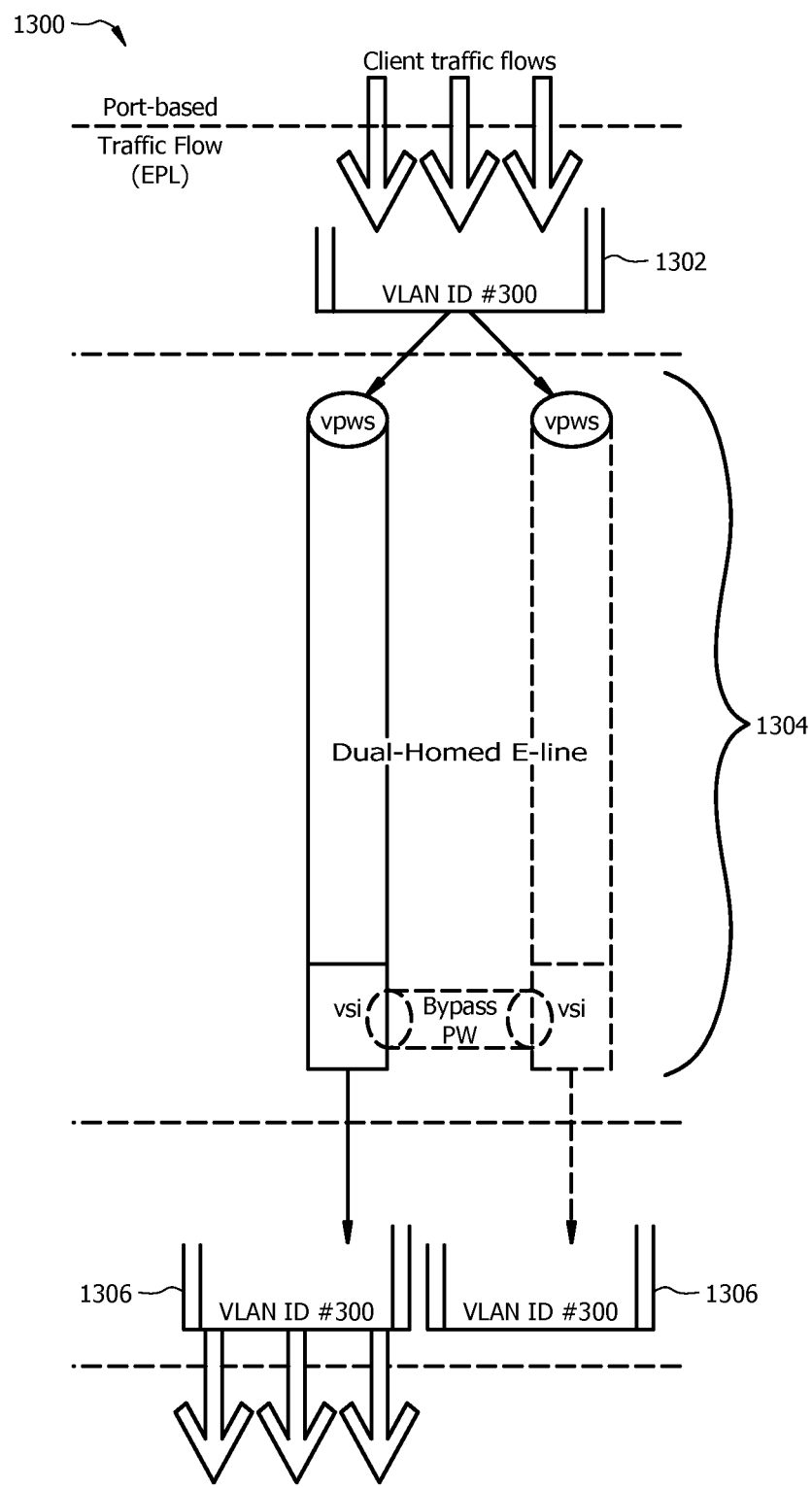
FIG. 13 is a schematic diagram of an embodiment of a traffic flow mapping using dual-homed E-lines.

FIG. 13 is a schematic diagram of an embodiment of a traffic flow mapping 1300 using dual-homed E-lines and transporting over a packet optical network. Traffic flow mapping 1300 communicates traffic flows from a first UNI port 1302 across a packet optical network 1304 using dual-homed E-lines to one or more second UNI ports 1306. A dual-homed E-line is configured to have one source PRG node and two sink PRG nodes. The first UNI port 1302 is configured as an EPL for port-based traffic flows.

Figure 14:
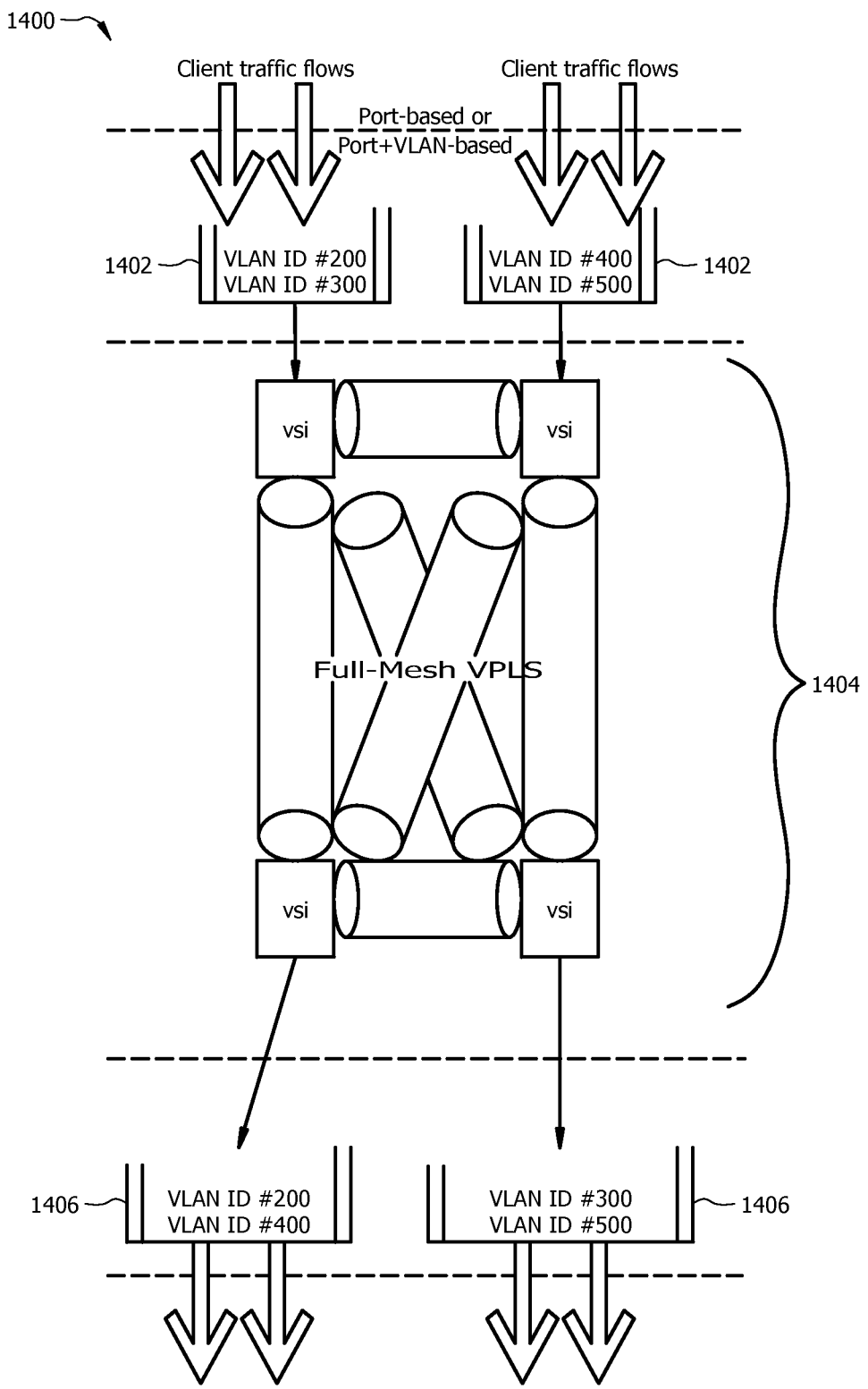
FIG. 14 is a schematic diagram of an embodiment of a traffic flow mapping using full-mesh virtual private local access network (LAN) services (VPLS).

FIG. 14 is a schematic diagram of an embodiment of a traffic flow mapping 1400 using full-mesh VPLS and transporting over a packet optical network. Traffic flow mapping 1400 communicates traffic flows from one or more first UNI ports 1402 across a packet optical network 1404 using full-mesh VPLS to one or more second UNI ports 1406. In a full-mesh VPLS, each VSI is connected to all of the other VSIs. The first UNI ports 1402 may be configured for port-based traffic flows or port and VLAN-based traffic flows. A full-mesh VPLS is configured to use PW/tunnels between all service sites.

Figure 15:
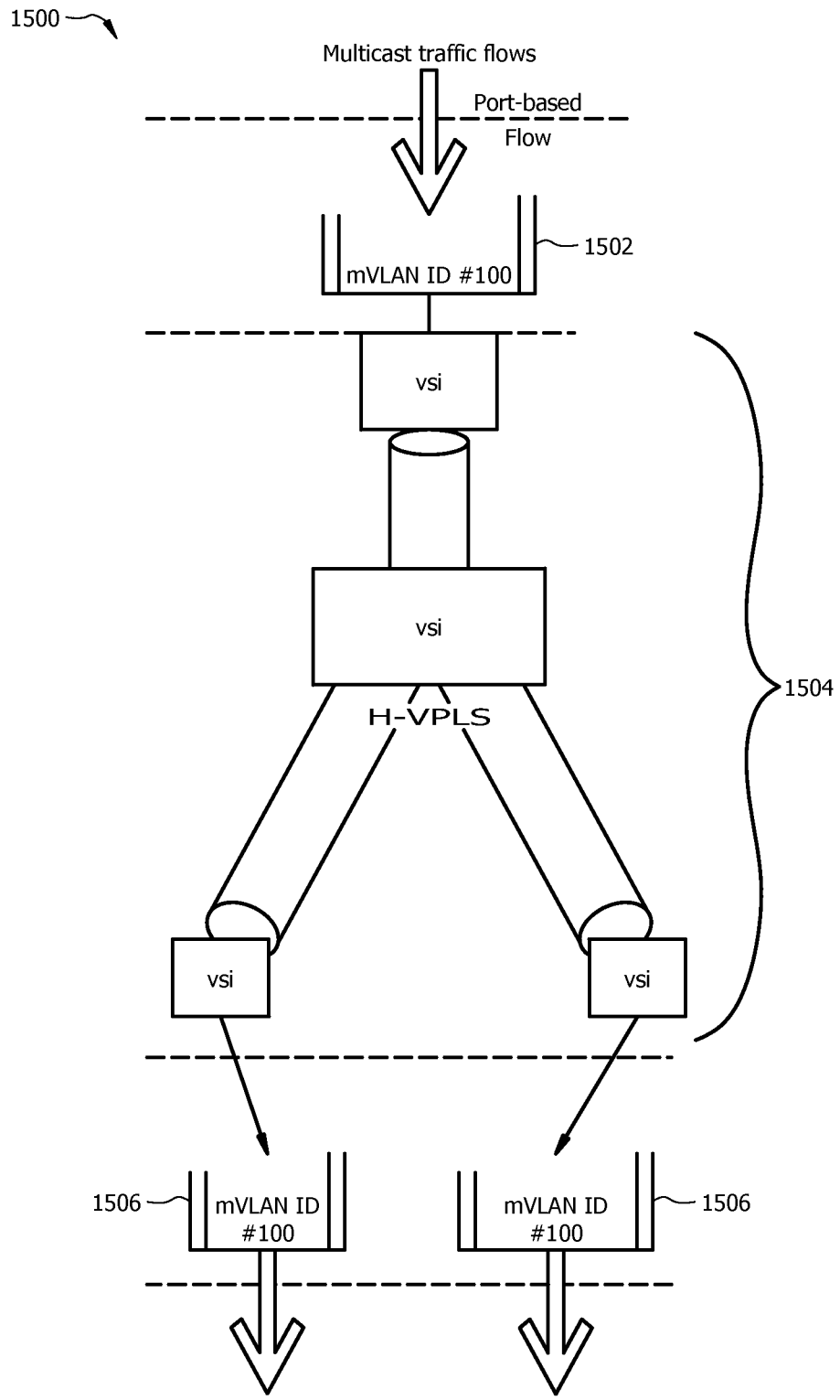
FIG. 15 is a schematic diagram of an embodiment of a traffic flow mapping using a hierarchical VPLS (H-VPLS).

FIG. 15 is a schematic diagram of an embodiment of a traffic flow mapping 1500 using an H-VPLS. Traffic flow mapping 1500 communicates traffic flows from a first UNI port 1502 across a packet optical network 1504 using a hierarchical VPLS (H-VPLS) to one or more second UNI ports 1506. An H-VPLS comprises a hub VSI within the packet optical network. The first UNI port 1502 is configured for port-based traffic flows. An H-VPLS may be configured with only PW/tunnels between the hub sites and the service sites and all packet flows are forwarded through intermediate hub sites. In an embodiment, traffic flows may comprise multicast traffic flows.

FIG. 16 is a flowchart of an embodiment of a NNI link resource dimensioning method 1600. Method 1600 may be implemented by a server for dimensioning NNI link resources using a shortest-path-first (SPF) algorithm based on adaptive weighting. Method 1600 may be employed for packet transport designing, packet layer capacity planning, and NNI link dimensioning for a packet optical network. For example, method 1600 may be implemented in step 308 in FIG. 3, step 1006 in FIG. 10, or step 1144 in FIG. 11. The server may be configured similarly to design server 106 in FIG. 1, for example.

At step 1602, the server obtains tunnel information for source sites and sink sites. Tunnels between source sites and sink sites may comprise QinQ tunnels and MPLS-TP LSP tunnels. Tunnel information may include, but is not limited to, routing constraints and routing policies, source PRG node identifiers, sink PRG node identifiers, bandwidth information, and type indicators. At step 1604, the server obtains traffic engineering rules. Traffic engineering rules, includes but are not limited to, bandwidth, policies, delay, packet loss, cost distance, affinity, a shortest path rules, and load-balancing rules. At step 1606, the server updates packet reachability graph weights based on the traffic engineering rules. On a packet reachability graph, PRG links can be weighted based on criteria including, but not limited to, the cost of new NNI links, the cost of line cards, optical transmission costs, available bandwidth for service, administrative costs, packet line card costs, and operation expense costs. One or more of these criteria may be considered when calculating the end-to-end path cost. As an example, the weight of a PRG link can be calculated with the following formula:

$$\text{Weight} = \frac{\text{Cost of a new } NNI \text{ link}}{(\text{Available bandwidth} + 1)}. \quad (2)$$

The weight of the PRG link is inversely proportional to the available bandwidth. The weight of the PRG link is reduced when the available bandwidth is large and is increased when the available bandwidth is small. At step 1608, the server calculates paths using K-shortest path algorithm. For example, the K-shortest path algorithm may employ Dijkstra's algorithm or any other suitable shortest path algorithm as would be appreciated by one of ordinary skill in the art upon viewing this disclosure. Additional details about Dijkstra's algorithm are described in, "A Note on Two Problems in Connexion with Graphs," by E. W. Dijkstra published on Jun. 11, 1959 and in, "The Algorithm Design Manual," by S. Skiena published in 2008, which are hereby incorporated by reference as if reproduced in their entirety. Each path is verified and the path with the minimum weight may be selected. For the tunnel 1:1/1+1 cases where two tunnels support one service for protection purposes, the server will compute two disjoint paths to satisfy include/exclude constraints or traffic engineering rules. At step 1610, the server creates new NNI links, if needed. New NNI links may be added along the paths calculated in step 1608. A new NNI link may also be created automatically when the minimal bandwidth for a service is not satisfied. At step 1612, the server updates the packet reachability graph with the new NNI links. At step 1614, the server adds the new NNI links to an output list for an optical layer sub-system design.

Figure 17:
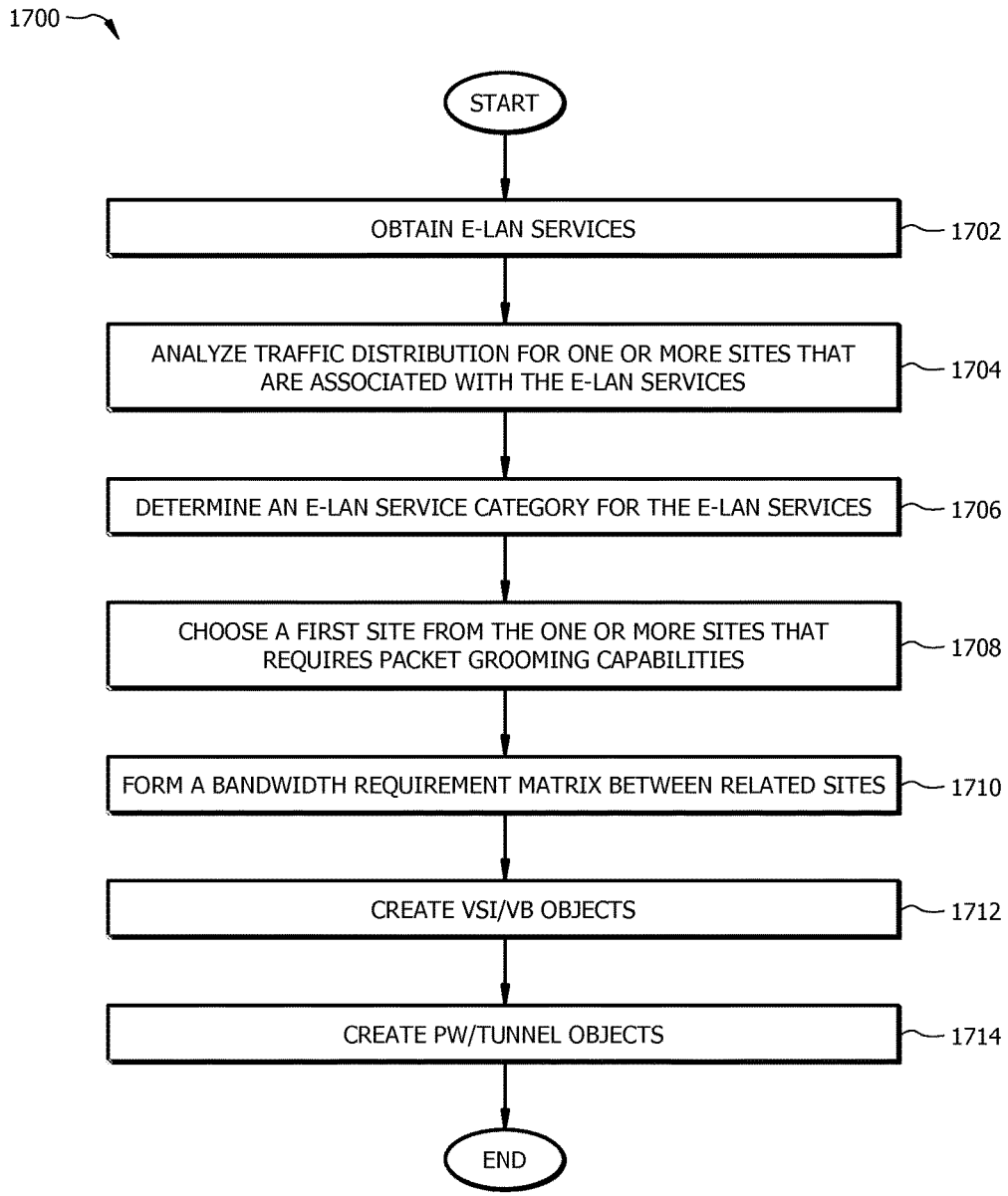
FIG. 17 is a flowchart of an embodiment of a packet E-local access network service planning method.

FIG. 17 is a flowchart of an embodiment of a packet E-LAN service planning method 1700. Method 1700 may be implemented by a server for designing VSI/VB bridges based on various E-LAN service topologies and traffic distributions for multiple sites. Method 1700 may be employed for packet transport designing, packet layer capacity planning, NNI link dimensioning for a packet optical network, and packet grooming. For example, method 1700 may be implemented in step 308 in FIG. 3, step 1006 in FIG. 10, or steps 1144 and 1156 in FIG. 11. The server may be configured similarly to design server 106 in FIG. 1. At step 1702, the server obtains E-LAN services.

At step 1704, the server analyzes traffic distribution for one or more sites that are associated with the E-LAN services. At step 1706, the server determines an E-LAN service category for the E-LAN services. Service categories include, but are not limited to, full-mesh VPLS and H-VPLS. At step 1708, the server chooses a first site from the one or more sites that requires packet grooming capabilities. At step 1710, the server forms a bandwidth requirement matrix between related sites. At step 1712, the server creates VSI/VB objects by associating UNI links and tunnels. Further, the server may set key attributes such as shared VLAN learning (SVL)/independent VLAN learning (IVL) mode. At step 1714, the server creates PW/tunnel objects, if needed. The server may also consider 1:1/1+1 protection requirements.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A packet optical network configuring method comprising:
   automatically obtaining, by a server, network information, the network information comprising an optical reachability graph for a packet optical network;
   generating, by the server, a packet reachability graph representing each integrated packet optical network node in the packet optical network using the network information;
   generating, by the server, a packet transport design for the packet optical network based on the packet reachability graph;
   generating, by the server, an optical transport design by mapping packet layer resources to physical fiber topology, determining a set of viable physical paths, and determining whether network equipment along the set of viable physical paths meets capacity requirements;
   generating, by the server, a network configuration based on the packet transport design and the optical transport design;
   determining, by the server, the network configuration is acceptable when the network configuration meets one or more predefined objectives; and
   transmitting, by the server, the network configuration to the packet optical network over a communications link, the network configuration based on the determination.

2. The method of claim 1, further comprising combining the network information into one or more data structures.

3. The method of claim 1, wherein generating the packet reachability graph comprises:
   generating a set of packet reachability graphs; and
   selecting the packet reachability graph from the set of packet reachability graphs.

4. The method of claim 1, further comprising generating a second packet reachability graph using the network information when the network configuration does not meet the one or more predefined objectives.

5. The method of claim 1, wherein the packet reachability graph is generated using software models.

6. The method of claim 1, wherein the network configuration configures the integrated packet optical network nodes for packet switching and optical switching.

7. A method comprising:
   automatically obtaining, by a server, an optical reachability graph and a packet capability site configuration for a packet optical network;
   generating, by the server, a packet reachability graph representing each integrated packet optical network node in the packet optical network for the packet optical network based on the optical reachability graph and the packet capability site configuration;
   performing, by the server, packet-layer capacity planning for the packet optical network based on the packet reachability graph;
   performing, by the server, optical transport network capacity planning for the packet optical network by mapping packet layer resources to physical fiber topology, determining a set of viable physical paths, and determining whether network equipment along the set of viable physical paths meets capacity requirements;
   generating, by the server, a network configuration based on the packet-layer capacity planning and the optical transport network capacity planning;
   determining, by the server, the network configuration is acceptable when the network configuration meets one or more predefined objectives;
   configuring, by the server, the packet optical network based on the network configuration; and
   transmitting the network configuration to the packet optical network over a communication line.

8. The method of claim 7, further comprising combining the optical reachability graph and the packet capability site configuration into one or more data structures.

9. The method of claim 7, wherein generating the packet reachability graph comprises:
   generating a set of packet reachability graphs; and
   selecting the packet reachability graph from the set of packet reachability graphs.

10. The method of claim 9, further comprising selecting a second packet reachability graph from the set of packet reachability graphs when the network configuration does not meet the one or more predefined objectives.

11. The method of claim 7, wherein the packet reachability graph is generated using software models.

12. The method of claim 7, wherein performing packet-layer capacity planning comprising obtaining packet traffic flows for the packet optical network.

13. The method of claim 7, wherein performing optical transport network capacity planning comprising obtaining circuit traffic flows for the packet optical network.

14. An apparatus comprising:
a receiver configured to automatically obtain network information that comprises an optical reachability graph for a packet optical network;
a memory;
a processor coupled to the receiver and the memory, the processor configured to:
generate a set of packet reachability graphs using the network information, wherein each packet reachability graph from the set of packet reachability graphs interconnects each integrated packet optical network node in the packet optical network for packet switching and optical switching; and
generate an optical transport design by mapping packet layer resources to physical fiber topology, determining a set of viable physical paths, and determining whether network equipment along the set of viable physical paths meets capacity requirements; and
a transmitter coupled to the processor, wherein the transmitter is configured to transmit the packet reachability graphs and the optical transport design to the packet optical network over a communication line.

15. The apparatus of claim 14, wherein the integrated packet optical network nodes are interconnected using a fiber topology and packet reachability graph links.

16. The apparatus of claim 14, wherein packet reachability graph link instances corresponding to the packet reachability graphs comprise network-to-network interface (NNI) links.

17. The apparatus of claim 14, wherein the processor is configured to generate a second set of packet reachability graphs using the network information when a network configuration for a first set of packet reachability graphs does not meet one or more predefined objectives.

18. The apparatus of claim 14, wherein the set of packet reachability graphs is generated using software models.

19. The apparatus of claim 14, wherein a first packet reachability graph from the set of packet reachability graphs is a single-stage packet reachability graph where the integrated packet optical network nodes are a single hop away from other integrated packet optical network nodes.

20. The apparatus of claim 14, wherein a first packet reachability graph from the set of packet reachability graphs is a multi-stage packet reachability graph where the integrated packet optical network nodes are more than a single hop away from other packet integrated packet optical network nodes.

* * * * *

UNITED STATES PATENT AND TRADEMARK OFFICE
CERTIFICATE OF CORRECTION

PATENT NO. : 10,205,523 B2
APPLICATION NO. : 14/827136
DATED : February 12, 2019
INVENTOR(S) : Wei Wei et al.

Page 1 of 1

It is certified that error appears in the above-identified patent and that said Letters Patent is hereby corrected as shown below:

On the Title Page

Column 1, (72) Inventors: should read:
Wei Wei, Plano, TX (US); Junqi Ma, Shenzhen (CN); Feng Liu, Shenzhen (CN)

Signed and Sealed this
Second Day of April, 2019

Andrei Iancu
*Director of the United States Patent and Trademark Office*